United States Patent
Degenfeld-Schonburg et al.

(10) Patent No.: US 11,099,013 B2
(45) Date of Patent: Aug. 24, 2021

(54) ONE-AXIS AND TWO-AXIS ROTATION RATE SENSOR

(71) Applicant: Robert Bosch GmbH, Stuttgart (DE)

(72) Inventors: Peter Degenfeld-Schonburg, Renningen (DE); Andreas Lassl, Korntal-Muenchingen (DE); Burkhard Kuhlmann, Reutlingen (DE); Niels Bode, Stuttgart (DE); Nils Felix Kuhlmann, Ehningen (DE); Reinhard Neul, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/636,532

(22) PCT Filed: Jul. 30, 2018

(86) PCT No.: PCT/EP2018/070574
§ 371 (c)(1),
(2) Date: Feb. 4, 2020

(87) PCT Pub. No.: WO2019/030037
PCT Pub. Date: Feb. 14, 2019

(65) Prior Publication Data
US 2020/0370888 A1    Nov. 26, 2020

(30) Foreign Application Priority Data
Aug. 7, 2017   (DE) .......................... 102017213637.5

(51) Int. Cl.
*G01C 19/5762* (2012.01)
*G01C 19/5712* (2012.01)
(Continued)

(52) U.S. Cl.
CPC ....... *G01C 19/5762* (2013.01); *G01C 19/574* (2013.01); *G01C 19/5712* (2013.01); *G01C 19/5747* (2013.01)

(58) Field of Classification Search
CPC ............ G01C 19/5762; G01C 19/5747; G01C 19/5712; G01C 19/574
See application file for complete search history.

(56) References Cited

U.S. PATENT DOCUMENTS

2007/0272015 A1*  11/2007  Kazama ............. G01C 19/5712
                                                    73/504.08
2012/0279301 A1*  11/2012  Gunthner ............. G01C 19/574
                                                    73/504.12
(Continued)

FOREIGN PATENT DOCUMENTS

| DE | 10300682 A1 | 7/2003 |
| DE | 10203515 A1 | 8/2003 |
| DE | 112012006056 T5 | 12/2014 |
| WO | 2017056222 A1 | 4/2017 |

OTHER PUBLICATIONS

International Search Report dated Nov. 13, 2018 of the corresponding International Appiication PCT/EP2018/070574 filed Jul. 30, 2018.

*Primary Examiner* — Helen C Kwok
(74) *Attorney, Agent, or Firm* — Norton Rose Fulbright US LLP; Gerard Messina

(57) ABSTRACT

A sensor includes a substrate having a first electrode arrangement; a first mass oscillator having (a) a first mass, (b) a first mass centroid, and (c) a second electrode arrangement including a first area centroid coinciding with the first mass centroid; and a second mass oscillator having (a) a second mass equal to the first mass, (b) a second mass centroid coinciding with the first mass centroid, and (c) a third electrode arrangement including a second area centroid coinciding with the first area centroid. Areas of the second (Continued)

and third electrode arrangements are equal. The sensor detects respective rotation rates around axes parallel to and perpendicular to a substrate extension. The oscillators are oscillatorily connected to each other and to the substrate, are deflectable, and experience respective forces in the directions of extension of the axes upon respective rotations around the other of the axes.

4 Claims, 3 Drawing Sheets

(51) Int. Cl.
  *G01C 19/5747* (2012.01)
  *G01C 19/574* (2012.01)

(56) References Cited

U.S. PATENT DOCUMENTS

| | | | |
|---|---|---|---|
| 2013/0298672 A1* | 11/2013 | Kuhlmann | G01C 19/5747 73/504.12 |
| 2015/0168437 A1* | 6/2015 | Jomori | G01C 19/5747 73/496 |
| 2015/0308830 A1* | 10/2015 | Su | G01C 19/5712 73/495 |
| 2016/0084654 A1* | 3/2016 | Senkal | G01C 19/5726 73/502 |
| 2017/0184400 A1 | 6/2017 | Valzasina et al. | |
| 2018/0259335 A1* | 9/2018 | Giner | G01C 19/5762 |

* cited by examiner

ONE-AXIS AND TWO-AXIS ROTATION RATE SENSOR

CROSS-REFERENCE TO RELATED APPLICATIONS

The present application is the national stage of International Pat. App. No. PCT/EP2018/070574 filed Jul. 30, 2018, and claims priority under 35 U.S.C. § 119 to DE 10 2017 213 637.5, filed in the Federal Republic of Germany on Aug. 7, 2017, the content of each of which are incorporated herein by reference in their entireties.

FIELD OF THE INVENTION

The present invention relates to a rotation rate sensor.

BACKGROUND

Such sensors are known from the related art in manifold example embodiments, which are used, for example, in automotive engineering, navigation, and entertainment electronics. In safety-relevant applications in the automotive field, one-axis rotation rate sensors are used, which each measures the rotation rate around a defined axis. The functional principle of such sensors is typically based on inertial forces acting in the sensor in the event of rotations and linear accelerations, which can be measured via the deflections of seismic masses induced thereby. Since in principle rotational velocities, rotational accelerations, and linear accelerations can similarly result in deflections, one desirable technical property is that the detection principle is robust with respect to external rotational and linear accelerations and thus enables a preferable uncorrupted measurement of the rotational velocity. In some applications, for example, in the case of rollover detection, the simultaneous measurement of rotation rates around various axes is used, which is presently implemented by the use of multiple individual sensors.

SUMMARY

An object of the present invention is to enable the detection of rotation rates around one or two axes using one single sensor element. To meet the requirements for safety-relevant applications in automotive engineering, the sensor is moreover to be robust in relation to external linear and rotational accelerations. Furthermore, the sensor is to include a small number of movable masses in order to reduce the sensitivity with respect to external vibrations.

The rotation rate sensor according to the present invention is designed for this purpose in such a way that the rotation rates with respect to two axes orthogonal in relation to each other can be measured via the movement of two seismic masses. This functionality offers multiple advantages over a combination of one-axis sensors. Thus, on the one hand, only one drive circuit is necessary, so that drive structures and terminal pads and the associated wiring can be saved in the sensor core. Furthermore, the structure of the sensor can be made more compact, since the sensor can be provided with only one drive control circuit. A further decisive advantage is that in the case of only one drive, in contrast to the two sensor cores having different drive frequencies, mutual influence is avoided, for example, due to parasitic crosstalk of the drive forces.

A further advantage of a multiaxis sensor design is the avoidance of interfering modes, which can result in various ways in a false signal of the sensor, for example, as a result of excitation due to external vibrations or nonlinear crosstalk in the mechanism or the electrostatics of the system. If multiple identical one-axis sensors are used, all sensors have the same interference modes, which are at slightly different frequencies because of processing, so that overall the number of the interference modes in an observed frequency range multiplies. Multiaxis sensor elements, in contrast, generally have a smaller number of interference modes. If, in addition, the same seismic masses and/or the same sensor core are used for more than only one measuring axis, a significant reduction of the interference modes can be achieved in this way.

The present invention is based on detecting a rotation rate of the sensor by way of the Coriolis forces acting on two mass oscillators. To be able to measurably delimit the Coriolis forces from other forces, which arise due to centrifugal accelerations and linear or rotational accelerations of the sensor, a basic concept of the present invention is to set the two mass oscillators into counter-phase oscillating movement in such a way that, at every point in time, the location and movement of the two mass oscillators are symmetrical in relation to each other in the following sense. Due to the counter-phase movement itself, it is ensured that the velocities of the two mass oscillators are equal but oriented in opposite directions at every point in time. The Coriolis forces determined by the velocities and the deflections caused thereby are accordingly also equal and oriented in opposite directions. If the mass oscillators are provided in such a way that all other influences due to linear or rotational accelerations and/or centrifugal accelerations result in identical, in particular identically oriented, deflections, the effect of the Coriolis forces can be isolated by a comparison of the deflections. The sensor principle is robust in this sense with respect to influences due to linear, centrifugal, and rotational accelerations. To guarantee the identically oriented deflections, the rotation rate sensor provided according to the present invention includes the meeting of four symmetry conditions.

To achieve the robustness with respect to linear accelerations, the masses of the two mass oscillators are equal. If the sensor experiences a linear acceleration as a whole, the accelerations and resulting deflections of the two mass oscillators are also equal due to the equal masses. As described hereafter, the deflection is measured via the relative movement of multiple electrode arrangements, of which one is fixedly connected to each mass oscillator and a further one is fixedly connected to the substrate in each case. The change of the relative location of the electrodes in relation to one another results in a measurable capacitance change, which is expressed in an electrical signal. The movement of the two mass oscillators is thus quantified by two different signals. The portions, as a result of identical deflections, cancel each other out due to a difference formation of the two signals, so that the portions remain which are caused by opposing deflections. The Coriolis force causes, as described above, precisely opposing deflections, while one deflection, as a result of a simultaneously acting linear acceleration, is eliminated upon the difference formation.

A similar principle also applies for the robustness with respect to rotational accelerations. In contrast to the Coriolis force, which is dependent on the direction of the movement, the accelerations which arise upon a change of the rotation rate are independent of the velocity and its direction, and can be eliminated in a similar manner as the linear accelerations by difference formation. The condition for this is that the deflection induced by the rotational acceleration is equal in both electrodes connected to the mass oscillators. This condition can be met in that both electrodes are designed in such a way that they have equal areas and, on the one hand, their area centroids coincide and, on the other hand, the area centroids coincide with the centroids of the mass oscillators.

To achieve a robustness with respect to centrifugal accelerations, it is sufficient for the mass centroids of both mass oscillators to coincide. Both mass oscillators are thus deflected identically under the centrifugal acceleration.

A rotation rate measurement with respect to two rotational axes perpendicular to each other can be carried out using a device that meets the mentioned symmetry conditions. To describe clearly the directions of the particular oscillations and deflections, it is reasonable to introduce a coordinate system. If the sensor is implemented as a micromechanical structure, the structure includes a main plane of extension that is parallel to the substrate. The counter-phase oscillation of the two mass oscillators is in this main plane of extension and defines a Y axis of the coordinate system. An X axis is defined by the Y axis perpendicularly thereto in the main plane of extension and a Z axis is defined perpendicularly to the main plane of extension. Upon a rotation around the X axis, a Coriolis force acts on the masses oscillating in the Y direction, which deflects the masses in the Z direction. Similarly, a rotation around the Z axis causes a deflection in the X direction.

To enable the movements for the detection of the rotation rate, the two masses are connected to the substrate so they can oscillate, on the one hand, the coupling being designed in such a way that both the oscillating movement induced by the drive and also the deflection as a result of the Coriolis forces are possible. Furthermore, the two mass oscillators are oscillatorily coupled to each other in such a way that the counter-phase drive movement is permitted and the counter-phase deflections as a result of the Coriolis forces are promoted.

The drive of the oscillation in the Y direction can be carried out, for example, using electrostatic forces. For this purpose, on the one hand, electrodes that are fixedly connected to the substrate are provided, and, on the other hand, electrodes that are each part of the two mass oscillators are provided. By applying a voltage between the electrodes, an electrostatic force takes effect between the mass oscillators and the substrate, using which the counter-phase oscillation can be excited.

The deflections in the X and Z directions caused by the Coriolis forces can also be detected via electrodes that can be at least partially identical to the driver electrodes. The deflections of the mass oscillators are accompanied by a displacement of the electrodes connected to the mass oscillators in relation to the substrate electrodes. This displacement is measurable via the capacitance change of the electrode arrangements, so that the two electrical signals associated with the mass oscillators enable a differential evaluation of the electrode displacement. The above-described symmetry conditions ensure that the influences of the rotational and linear accelerations and the centrifugal accelerations can be eliminated in this evaluation.

According to an example embodiment of the present invention, the counter-phase oscillation of the mass oscillators in the Y direction is excited by a drive frame that is oscillatorily connected to both mass oscillators. The drive frame is electrostatically actuated, for example, by drive combs.

According to an example embodiment of the present invention, the counter-phase oscillation of the mass oscillators in the Y direction is excited by two drive frames, of which one is oscillatorily connected to the first mass oscillator and a further one is oscillatorily connected to the second mass oscillator. Both drive frames can also be electrostatically actuated via drive combs.

DETAILED DESCRIPTION

Figure 1:
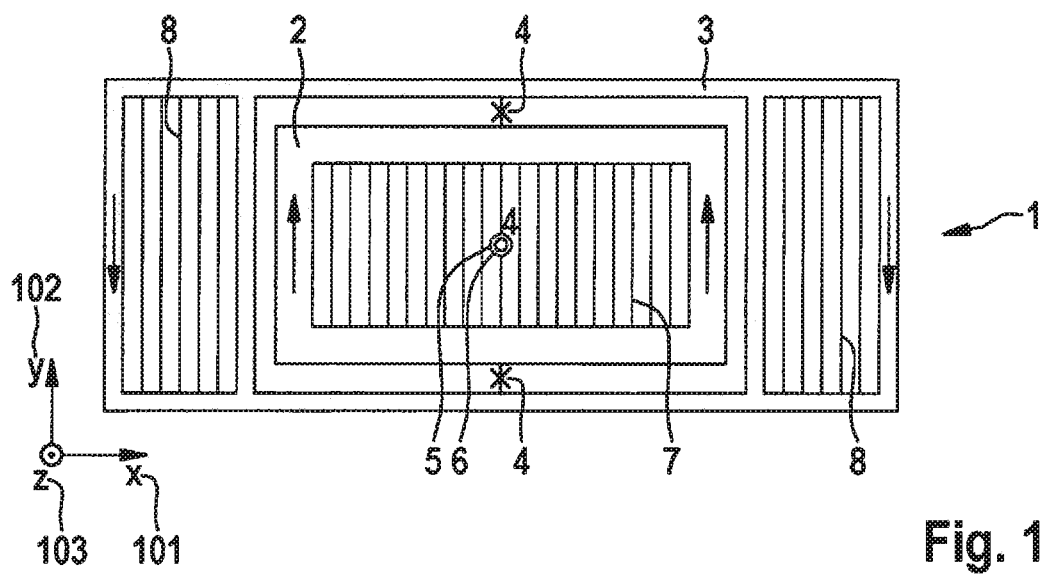
FIG. 1 shows a schematic top view of a rotation rate sensor according to an example embodiment of the present invention.

In the various figures, identical parts are always provided with identical reference numerals and are therefore generally also only mentioned or noted once in each case.

A schematic top view of a rotation rate sensor 1 according to an example embodiment of the present invention is shown in FIG. 1. The main plane of extension of sensor 1 is the plane of the drawing here. First mass oscillator 2 is provided by an inner detection frame and second mass oscillator 3 is provided by an outer detection frame. Both mass oscillators 2, 3 are connected to each other by a coupling element 4 and are excited by a drive mechanism (not shown) in such a way that they oscillate in counter-phase in relation to one another in Y direction 102. If the sensor is set into rotation, the Coriolis forces linked thereto thus act in a direction perpendicular to the rotational axis and perpendicular to the velocities of mass oscillators 2, 3. Therefore, a deflecting force only acts on the counter-phase oscillation in Y direction 102 if the rotational axis does not coincide with Y direction 102. The sensor is thus sensitive with respect to rotational axes in X direction 101 (in the main plane of extension and perpendicular to the Y direction) and in Z direction 103 (perpendicular to the main plane of extension). Upon a rotation around the X axis, mass oscillators 2, 3 are deflected by the Coriolis force along Z axis 103, while a rotation around Z axis 103 results in a deflection along the X axis. Because the velocities of the two mass oscillators 2, 3 are oriented in opposite directions at every point in time in the case of the counter-phase oscillation, the deflections due to the Coriolis force also take place in counter-phase. The two mass oscillators 2, 3 are coupled to each other in such a way that the counter-phase movement in Y direction 102 is permitted and the counter-phase deflections by the Coriolis forces are promoted.

Mass oscillators 2, 3 each includes electrode arrangements 7, 8 that are carried along during the movement. A further electrode arrangement 9 (not shown) is connected to the substrate, so that the relative displacement of first electrode arrangement 7 in relation to substrate electrode arrangement 9 can be measured by a capacitance change, while similarly the displacement of second electrode arrangement 8 in relation to substrate electrode arrangement 9 induces a second capacitance change.

The sensor concept according to the present invention requires a high level of symmetry of the geometry, which is provided by four symmetry conditions. According to the first symmetry condition, mass centroid 5 of first mass oscillator 2 coincides with second mass centroid 6 of second mass oscillator 3. According to the second symmetry condition, area centroid of first electrode arrangement 7 coincides with area centroid of second electrode arrangement 8. The third symmetry condition is that the two area centroids coincide with the two mass centroids 5, 6 of the mass oscillators. The fourth symmetry condition is that the two electrode arrangements 7, 8 have equal areas and mass oscillators 2, 3 have equal masses.

Figure 2:
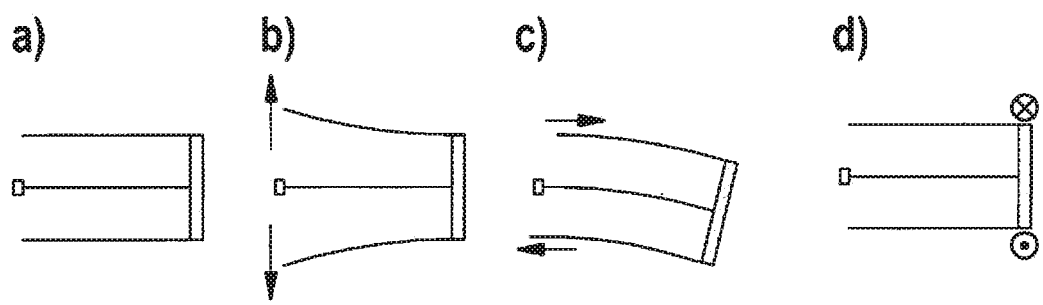
FIG. 2 schematically shows a coupling element for an example embodiment of the present invention.

FIG. 2 schematically shows a coupling element 3 that can be used for the oscillatorily coupling of first mass oscillator 2 to second mass oscillator 3. In the state of coupling element 3 shown in FIG. 2a, the two components coupled to each other are not deflected toward each other. A counter-phase deflection in various coupling directions is shown in each of FIG. 2, parts (b)-(d). While the coupling element permits the counter-phase movement in part (b), the counter-phase movements are promoted in parts (c) and (d). Such a coupling element can advantageously be used for the sensor according to the present invention, for example, so that it permits the counter-phase oscillation in Y direction 102, but the counter-phase deflections caused by the Coriolis forces in X and Z direction (102 and 103, respectively) are promoted.

Figure 3:
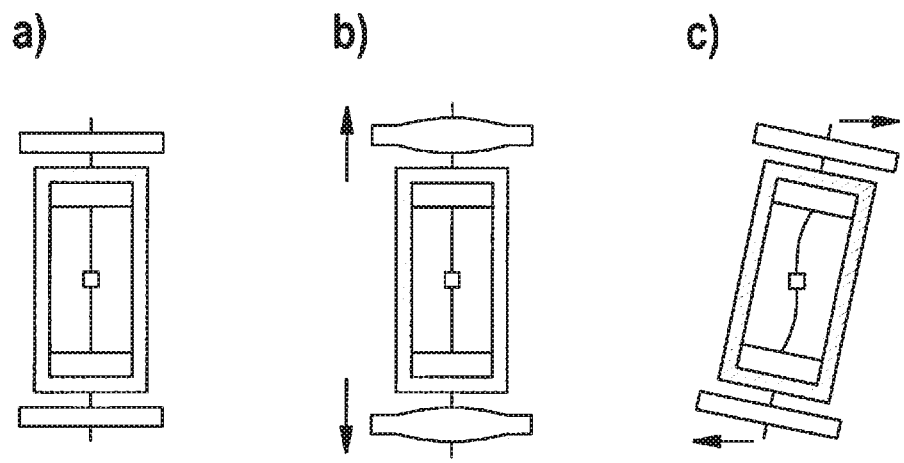
FIG. 3 schematically shows a further coupling element for an example embodiment of the present invention.

FIG. 3 shows a further coupling element 3 that can be used for the oscillatory coupling of first mass oscillator 2 to second mass oscillator 3. FIG. 3, part (a) shows, similarly to FIG. 2, part (a), the undeflected state, while FIG. 3, parts (b) and (c) show various coupling directions. The coupling direction in FIG. 3, part (b) is permitted, the direction in FIG. 3, part (c) is promoted, and the third deflection direction is suppressed. Such an element can be used for the coupling of the two mass oscillators 2, 3 according to an example embodiment of the present invention, in which the symmetry conditions guarantee the robustness with respect to linear and rotational accelerations and with respect to centrifugal accelerations, but in the case of which only one deflection direction is possible and accordingly only one rotational axis can be detected.

Figure 4:
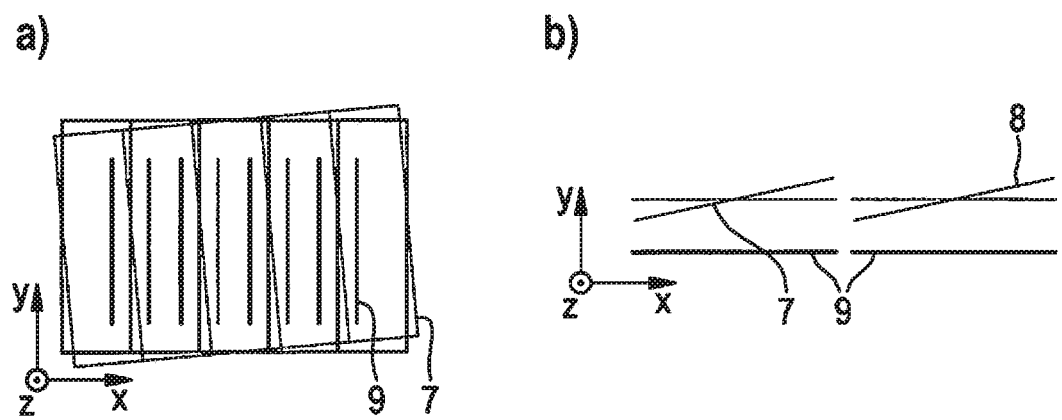
FIG. 4 schematically shows two relative deflections between the electrodes due to an external rotational acceleration, according to an example embodiment of the present invention.

Two relative deflections between electrodes 7, 8 connected to mass oscillators 2, 3 and electrode arrangement 9 connected to the substrate are shown in FIG. 4. Due to an external rotational acceleration, electrode arrangements 7, 8 connected to mass oscillators 2, 3 tilt in relation to substrate electrode arrangement 9. This tilt is shown upon a rotation around Z axis 103 in FIG. 4, part (a) and upon a rotation around X axis 101 in FIG. 4, part (b). The equivalence of area and mass centroids 5, 6 ensures, together with the differential capacitance evaluation, the robustness with respect to such rotational accelerations.

Figure 5:
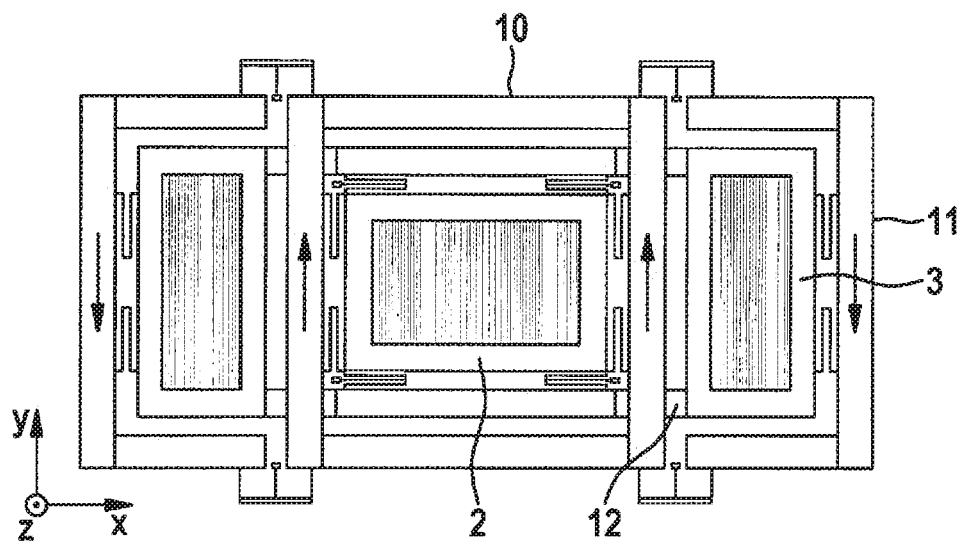
FIG. 5 shows an example embodiment of the present invention in which the two mass oscillators are driven by two drive frames.

Another example embodiment of the present invention is shown in FIG. 5, in which the two mass oscillators 2, 3 are provided by an inner and an outer detection frame and the excitation of the oscillation is carried out by two drive frames 10. Inner drive frame 10 drives first mass oscillator 2, while two outer drive frames 10, 11 drive second mass oscillator 3. The two outer drive frames 10, 11 are coupled for this purpose to second mass oscillator 3, on the one hand, and oscillatorily to each other, on the other hand. In this arrangement, an intersection of the outer detection frame (second mass oscillator 3) with inner drive frame 10 should be provided, which can be implemented using a second mechanical layer 12, which extends either above or below the first layer and is connected to the first layer. In an alternative example embodiment, in contrast, the second layer can also connect an inner drive frame 10 to an outer detection frame (second mass oscillator 3).

Figure 6:
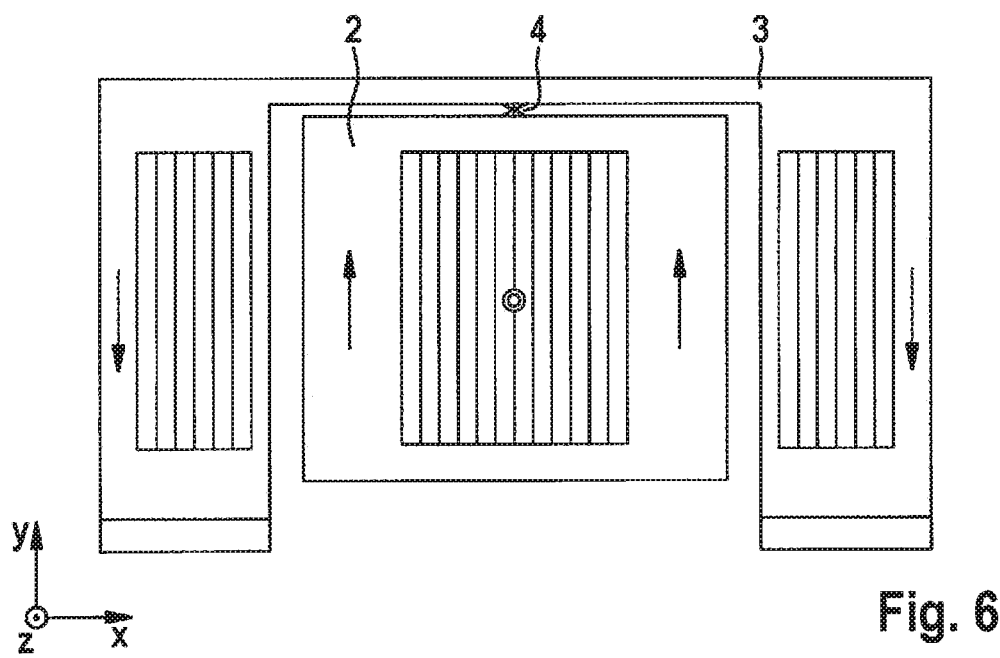
FIG. 6 shows an alternative example embodiment of the present invention in which the second mass oscillator is provided by an open detection frame.

FIG. 6 shows another example embodiment of the present invention, in which second mass oscillator 3 is provided by an open detection frame. The advantage of this variant is that, upon the addition of a drive frame, intersections of mechanical structures can be dispensed with and therefore a second mechanical layer 12 does not have to be used. The structure in the image is not point-symmetrical around shared centroid 5, 6 of the two mass oscillators 2, 3, in contrast to the structure in FIG. 1, but nonetheless meets the symmetry conditions according to the present invention.

What is claimed is:

1. A rotation rate sensor comprising:
a substrate that includes a first electrode arrangement;
a first mass oscillator that includes:
  a first mass;
  a first mass centroid; and
  a second electrode arrangement that includes a first area centroid that coincides with the first mass centroid; and
a second mass oscillator that includes:
  a second mass that is equal to the first mass;
  a second mass centroid that coincides with the first mass centroid; and
  a third electrode arrangement that includes a second area centroid that coincides with the first area centroid;
wherein:
  an area of the third electrode arrangement is equal to an area of the second electrode arrangement;
  the rotation rate sensor is configured to detect a first rotation rate around a first rotational axis that extends along a direction that is essentially parallel to a main plane of extension of the substrate and/or a second rotation rate around a second rotational axis that extends along a direction that is essentially perpendicular to the main plane of extension; and
  the first and second mass oscillators:
    are oscillatorily connected to each other and to the substrate;
    are deflectable in a drive movement direction in counter-phase along a direction that is perpendicular to the directions of extension of each of the first and second rotational axes;
    experience a first force in the direction of extension of the second rotational axis upon a rotation around the first rotational axis; and
    experience a second force in the direction of extension of the first rotational axis upon a rotation around the second rotational axis.

2. The rotation rate sensor of claim 1, wherein:
the first force results in a first detection movement of the first and second mass oscillators, in the direction of extension of the second rotational axis;
the first detection movement is linked to a first capacitance change, which is between the first and second electrode arrangements, and to a second capacitance change, which is between the first and third electrode arrangements;
the second force results in a second detection movement of the first and second mass oscillators, in the direction of extension of the first rotational axis;

the second detection movement is linked to a third capacitance change, which is between the first and second electrode arrangements, and to a fourth capacitance change, which is between first and third electrode arrangements;

the first rotation rate is measurable by a differential evaluation of the first and second capacitance changes; and the second rotation rate is measurable by a differential evaluation of the third and fourth capacitance changes.

3. The rotation rate sensor of claim 1, further comprising:
a first drive frame that is deflectable in the drive movement direction and oscillatorily coupled to the first and second mass oscillators.

4. The rotation rate sensor of claim 1, further comprising:
a first drive frame that is deflectable in the drive movement direction and oscillatorily coupled to the first mass oscillator; and
a second drive frame that is deflectable in the drive movement direction and oscillatorily coupled to the second mass oscillator.

\* \* \* \* \*